United States Patent [19]

Yamamoto et al.

[11] Patent Number: 5,443,929
[45] Date of Patent: Aug. 22, 1995

[54] NONAQUEOUS SECONDARY BATTERY

[75] Inventors: Yuji Yamamoto, Hirakata; Toshiyuki Nohma; Hiroshi Kurokawa, both of Kadoma; Mayumi Uehara, Kyoto; Koji Nishio, Hirakata; Toshihiko Saito, Tsuzuki, all of Japan

[73] Assignee: Sanyo Electric Co., Ltd., Osaka, Japan

[21] Appl. No.: 106,611

[22] Filed: Aug. 16, 1993

[30] Foreign Application Priority Data

Sep. 25, 1992 [JP] Japan .................. 4-280469

[51] Int. Cl.$^6$ .................. H01M 4/50; H01M 6/16
[52] U.S. Cl. .................. 429/224; 429/197
[58] Field of Search .................. 429/224, 194, 197; H01M 4/50

[56] References Cited

U.S. PATENT DOCUMENTS 4,246,253  1/1981  Hunter .................. 429/224 X
5,153,081  10/1992  Thackeray et al. .................. 429/224 X

FOREIGN PATENT DOCUMENTS 220357  9/1990  Japan .................. H01M 4/50

*Primary Examiner*—John S. Maples
*Attorney, Agent, or Firm*—Birch, Stewart, Kolasch & Birch

[57] ABSTRACT

Provided is a nonaqueous battery having an active material of a positive electrode formed from a composite powder consisting of $Li_{1-x}Mn_2O_4$ ($0 \leq X \leq 1$) and $Li_2MnO_3$. Because the active material has the form of a composite, this battery allows little of the manganese to dissolve out during charge and hence has excellent charge-discharge characteristics.

13 Claims, 3 Drawing Sheets

NONAQUEOUS SECONDARY BATTERY

BACKGROUND OF THE INVENTION

This application claims the priority of Japanese Patent Application No. 4-280469 filed Sep. 25, 1992, which is incorporated herein by reference.

2. Field of the invention

The present invention relates to a nonaqueous secondary battery comprising an oxide of manganese as an active material of a positive electrode and, more particularly, to improvement of this active material in order to improve the charge-discharge cycle characteristics.

2. Description of the prior art

Manganese oxides of the general formula $Li_{1-x}Mn_2O_4$ ($0 \leq X \leq 1$), typically $LiMn_2O_4$, have been used as active materials of positive electrodes of nonaqueous secondary batteries, because these oxides permit high voltage to be taken out.

However, with the above manganese oxides, manganese dissolves out during charge when the positive electrode has high potential, and hence there has been a problem that positive electrodes containing such manganese oxides markedly decrease their discharge capacity at an initial period of charge-discharge cycle.

SUMMARY OF THE INVENTION

Accordingly, an object of the present invention is to provide a nonaqueous secondary battery having excellent charge-discharge characteristics, by preventing manganese from dissolving out, during charge, from manganese oxide constituting the active material of the positive electrode.

According to the present invention, the above object can be achieved by providing a nonaqueous secondary battery having an active material of a positive electrode comprising a composite powder comprising $Li_{1-x}Mn_2O_4$ ($0 \leq X \leq 1$) and $Li_2MnO_3$.

BRIEF DESCRIPTION OF THE DRAWINGS

A more complete appreciation of the invention and many the attendant advantages thereof will be readily obtained as the same become better understood by reference to the following detailed description when considered in connection with the accompanying drawings, wherein.

DETAILED DESCRIPTION OF THE PREFERRED EMBODIMENT

Figure 1:
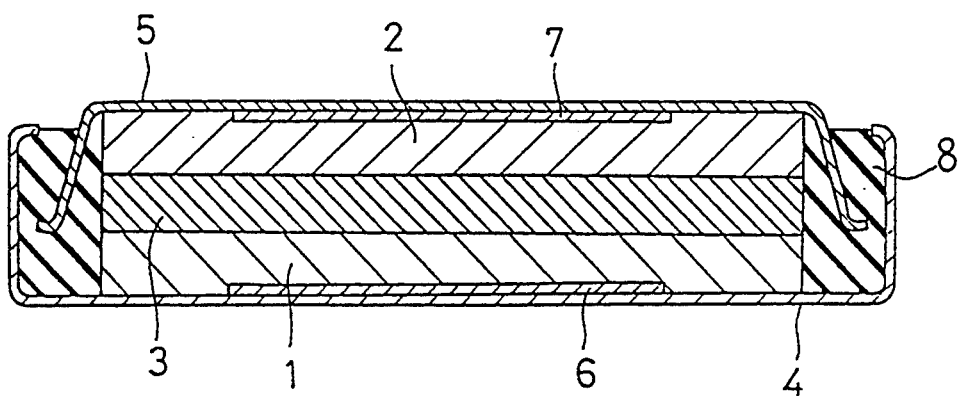
FIG. 1 is a schematic cross-sectional view of a flat-type embodiment of the battery of the present invention.

The most desirable powders usable for the present invention are composite powders comprising a powder $Li_{1-x}Mn_2O_4$ ($0 \leq X \leq 1$) and, formed on the surface of each of particles constituting the powder, a layer of $Li_2MnO_3$.

A representative example of the powder of $Li_{1-x}Mn_2O_4$ ($0 \leq X \leq 1$) is that of $LiMn_2O_4$.

The composite powder comprising a powder of $Li_{1-x}Mn_2O_4$ and, formed on the surface of each of the particles, a layer of $Li_2MnO_3$ can be obtained for example by a process which comprises the successive steps of mixing lithium hydroxide (LiOH) powder and manganese dioxide ($MnO_2$) powder in a molar ratio of 1:2, heating the mixture at about 850° C. to obtain a powder of $LiMn_2O_4$, mixing the obtained powder with lithium hydroxide powder and heating the resulting mixture in air at about 375° C.

The above composite powder preferably has an Li/Mn ratio of 0.52 to 1.20. With an Li/Mn ratio of less than 0.52 the effect of the present invention of improving charge-discharge cycle characteristics by combination with $Li_2MnO_3$ does not exhibit sufficiently., while with the ratio exceeding 1.20 the discharge capacity decreases.

The active material of a positive electrode in the present invention is generally used, after being kneaded with a binder such as fluororesin and, if necessary, a conductive agent such as carbon black, for preparing the positive electrode.

The present invention has solved the problem associated with conventional nonaqueous secondary batteries that their charge-discharge characteristics become worse due to manganese dissolving out by reaction of the manganese oxide and nonaqueous electrolyte solution used during charge when the positive electrode has high potential. The problem has been solved by the use, as an active material of a positive electrode, of a composite powder comprising $Li_{1-x}Mn_2O_4$ and $Li_2MnO_3$. It is therefore possible to use, for other parts constituting the battery, such as nonaqueous electrolyte solution, negative electrode material and separator, various materials having been generally used or proposed for nonaqueous secondary batteries, with no particular limitation.

Examples of solvents for nonaqueous electrolyte solutions usable in the present invention are organic solvents, e.g. propylene carbonate, ethylene carbonate and 1,2-butylene carbonate and mixed solvents comprising the above organic solvents and a low-boiling-point solvent such as dimethyl carbonate, diethyl carbonate, 1,2-dimethoxyethane, 1,2-diethoxyethane or ethoxymethoxyethane. Examples of solutes usable in the invention are $LiPF_6$, $LiClO_4$ and $LiCF_3SO_3$.

Usable negative electrode materials are metallic lithium and substances capable of occluding and discharging lithium. Examples of the latter are lithium alloys, specific oxides and carbon materials. Powder materials such as carbon materials are generally used for preparing negative electrodes after being kneaded with a binder such as polytetrafluoroethylene.

Other features of the invention will become apparent in the course of the following descriptions of exemplary embodiments which are given for illustration of the invention and are not intended to be limiting thereof.

EXAMPLE 1

A flat-type nonaqueous secondary battery according to the present invention was prepared as follows.

Preparation of positive electrode

A mixture of lithium hydroxide powder and manganese dioxide powder in a molar ratio of 1:2 was heated in air at 850° C. for 20 hours, to yield a powder of lithium-containing manganese oxide ($LiMn_2O_4$) having spinel structure. The identification of the $LiMn_2O_4$ was conducted by collating the results obtained by X-ray diffractometry with JCPDS card (this method was also used in the succeeding Examples).

The thus obtained $LiMn_2O_4$ powder was mixed with lithium hydroxide powder in a molar, ratio of 1:0.02, and the mixture was heated in air at 375° C. for 20 hours to yield a composite powder comprising a powder of $LiMn_2O_4$ and, formed on the surface of each of the $LiMn_2O_4$ particles, a layer of $Li_2MnO_3$. Here, the identification of the $LiMn_2O_4$ and $Li_2MnO_3$ was also conducted, as above, by collating the results of X-ray diffractometry with JCPDS cards (this method applied also in the succeeding Examples). Chemical analysis revealed that the composite powder had an Li/Mn ratio of 0.51 (the Li/Mn ratios in the succeeding Examples were also obtained by similar chemical analyses).

An agent for preparing positive electrode was prepared by mixing the thus obtained composite powder as an active material of the positive electrode, carbon black as a conductive agent and fluororesin as a binder in a ratio by weight of 85:10:5. The agent thus prepared was then molded into a disc-shaped positive electrode. Stainless steel plate (SUS304; Japanese Industrial Standard Code) was used as a positive electrode collector. The positive electrode was dried in vacuum at 250° C. before the construction of the battery.

Preparation of negative electrode

A disc-shaped negative electrode comprising metallic lithium was prepared by rolling and punching. Stainless steel plate (SUS304) was used as a negative electrode collector. The positive electrode was dried in vacuum before the construction of the battery.

Preparation of nonaqueous electrolyte solution $LiPF_6$ (lithium hexafluorophosphate) was dissolved in a 1/1 by volume mixed solvent of propylene carbonate (PC) and 1,2-dimethoxyethane (DME) in a concentration of 1 mole/liter to give a nonaqueous electrolyte solution.

Preparation of battery

The positive and negative electrode and nonaqueous electrolyte solution prepared above were used to prepare a flat-type battery BA1 according to the present invention (battery size: diameter=24 mm and thickness=3 mm). A microporous thin membrane of polypropylene was used as a separator and impregnated with the above nonaqueous electrolyte solution.

FIG. 1 is a schematic cross-sectional view showing the battery BA1 according to the present invention thus prepared, which comprises a positive electrode 1, a negative electrode 2, a separator 3 separating the two electrodes, a positive electrode can 4, a negative electrode can 5, a positive electrode collector 6, a negative electrode collector 7 and a polypropylene insulating packing 8. The positive electrode 1 and the negative electrode 2 were, while facing with each other via the separator 3, housed in a battery case formed by the positive and negative electrode cans 4 and 5. The positive electrode 1 was connected via the positive electrode collector 6 to the positive electrode can 4 and the negative electrode 2 via the negative electrode collector 7 to the negative electrode can 5, so that the chemical energy generated in the battery BA1 of the present invention can be taken out from the terminals of the positive and negative electrode cans 4 and 5 as electric energy.

EXAMPLE 2

Example 1 was repeated except that in the preparation of positive electrode the molar ratio of mixing of $LiMn_2O_4$ powder and lithium hydroxide powder was changed to 1:0.04, to prepare a battery BA2 according to the present invention.

In the above positive electrode, the Li/Mn ratio of the composite powder that constituted the active material of the positive electrode and consisted of $LiMn_2O_4$ and $Li_2MnO_3$ was 0.52.

EXAMPLE 3

Example 1 was repeated except that in the preparation positive electrode the molar ratio of mixing of $LiMn_2O_4$ powder and lithium hydroxide powder was changed to 1:0.2, to prepare a battery BA3 according to the present invention.

In the above positive electrode, the Li/Mn ratio of the composite powder that constituted the active material of the positive electrode and consisted of $LiMn_2O_4$ and $Li_2MnO_3$ was 0.60.

EXAMPLE 4

Example 1 was repeated except that in the preparation of positive electrode the molar ratio of mixing of $LiMn_2O_4$ powder and lithium hydroxide powder was changed to 1:1.4, to prepare a battery BA4 according to the present invention.

In the above positive electrode, the Li/Mn ratio of the composite powder that constituted the active material of the positive electrode and consisted of $LiMn_2O_4$ and $Li_2MnO_3$ was 1.20.

EXAMPLE 5

Example 1 was repeated except that in the preparation of positive electrode the molar ratio of mixing of $LiMn_2O_4$ powder and lithium hydroxide powder was changed to 1:1.6, to prepare a battery BA5 according to the present invention.

In the above positive electrode, the Li/Mn ratio of the composite powder that constituted the active material of the positive electrode and consisted of $LiMn_2O_4$ and $Li_2MnO_3$ was 1.30.

EXAMPLE 6

A mixture of lithium hydroxide powder and manganese dioxide powder in a molar ratio of 3:5 was heated in air at 850° C. for 20 hours, to yield a composite powder consisting of lithium-containing manganese oxide ($LiMn_2O_4$) having spinel structure and a lithium-containing manganese oxide ($Li_2MnO_3$) having a layer structure. The composite powder had an Li/Mn ratio of 0.60.

Example 1 was repeated except that the thus prepared composite powder was used as an active material of the positive electrode, to prepare a battery BA6 according to the present invention.

COMPARATIVE EXAMPLE 1

A mixture of lithium hydroxide powder and manganese dioxide powder in a molar ratio of 1:2 was heated in air at 850° C. for 20 hours, to yield a powder of $LiMn_2O_4$ having spinel structure.

Example 1 was repeated except that the $LiMn_2O_4$ powder thus obtained was used instead of the composite powder consisting of $LiMn_2O_4$ and $Li_2MnO_3$, as an active material of the positive electrode, to prepare a comparison battery BC1.

Continuous charge test

The BA1 through BA6 according to the present invention and the comparison battery BC1 were continuously charged at 4.5 V, and the time courses of their internal resistance were observed. The results are shown in FIG. 2.

Figure 2:
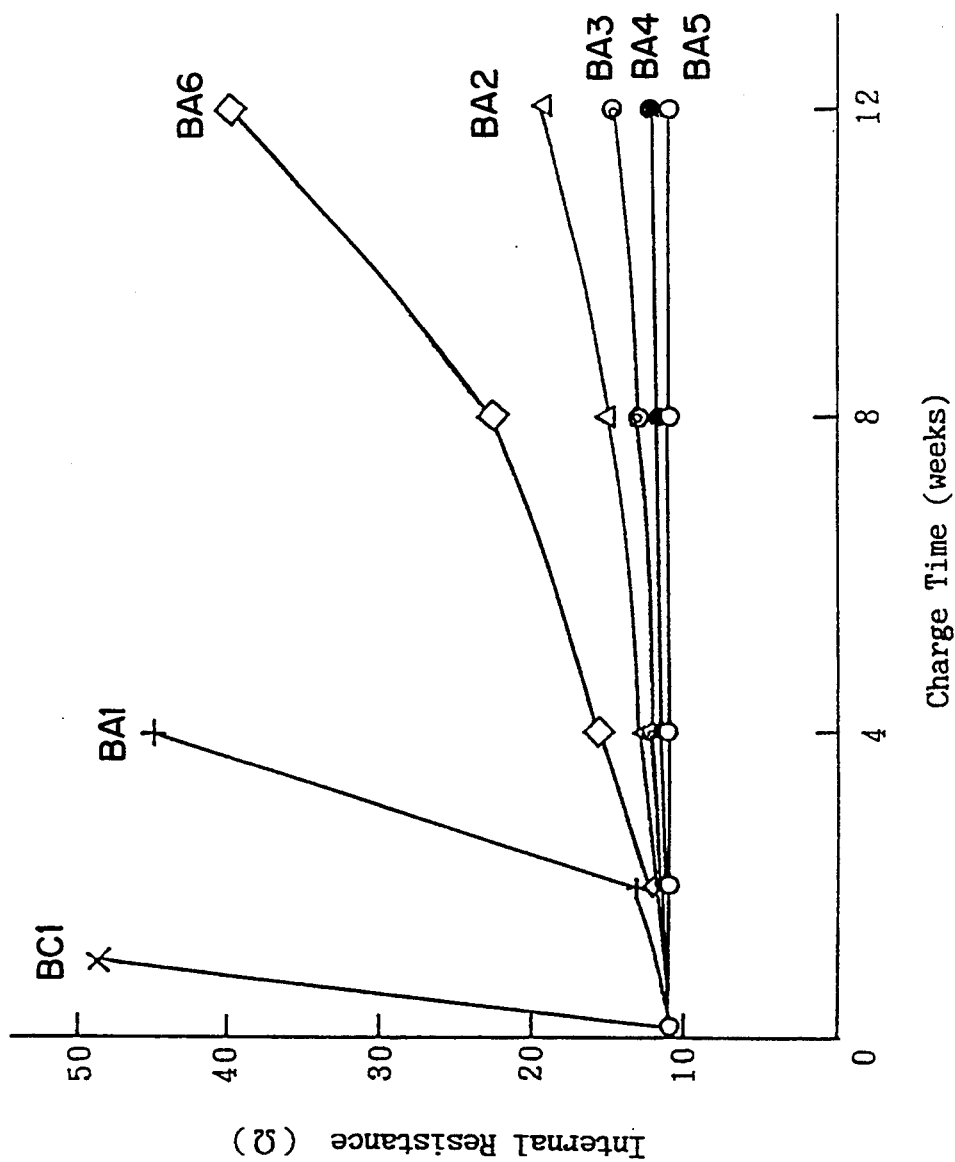
FIG. 2 is a graph showing how the internal resistance changes during continuous discharge with batteries according to the present invention, and comparison battery.

FIG. 2 is a graph showing how the internal resistance of each of the batteries changed, wherein the ordinate represents the internal resistance and the abscissa the charge time (weeks).

From FIG. 2, it is understood that while the batteries of the present invention utilizing as an active material of the positive electrode a composite powder comprising $LiMn_2O_4$ and $Li_2MnO_3$ showed almost no or, if at all, very slow increase in the internal resistance, the comparison battery BC1 showed a sharp increase in the internal resistance which reached 50 Ω in a week after the start of charge. The sharp increase in the internal resistance of the comparison battery BC1 is considered to be due to clogging of micropores of the separator by deposition, on the lithium negative electrode, of Mn having dissolved out from the positive electrode. The large increase in internal resistance as seen in the comparison battery BC1 renders it difficult to continue charge, thereby decreasing the battery capacity.

From comparison between the batteries BA1 through BA6 of the present invention, it is understood that the larger the Li/Mn ratio, i.e. the higher the content of $Li_2MnO_3$ in the composite powder used, the smaller the increase in the internal resistance. The mechanism involved in this phenomenon is not clear, but it is attributable to $Li_2MnO_3$ playing a role of suppressing dissolving out of Mn from $LiMn_2O_4$.

Besides, comparison of the batteries BA3 and BA6, both having the same Li/Mn ratio of the composite powder, of the present invention shows that the increase in the internal resistance is smaller with BA3 than with BA6. This is attributable to the difference in the process for the preparation of the active materials of the positive electrodes. That is, while for the battery BA3 of the present invention (also for BA1, BA2, BA4 and BA5) a layer of $Li_2MnO_3$ is selectively formed on the particles of $LiMn_2O_4$, for BA6 crystals of $LiMn_2O_4$ and $Li_2MnO_3$ are randomly formed in the active material of the positive electrode.

Cycle test

The BA1 through BA6 according to the present invention and the comparison battery BC1 were subjected to a cycle test at room temperature (25° C.), one cycle consisting of charge with 3 mA up to 4.5 V and the succeeding discharge with 3 mA down to 3.0 V, and their charge-discharge cycle characteristics were studied. The results are shown in FIG. 3.

Figure 3:
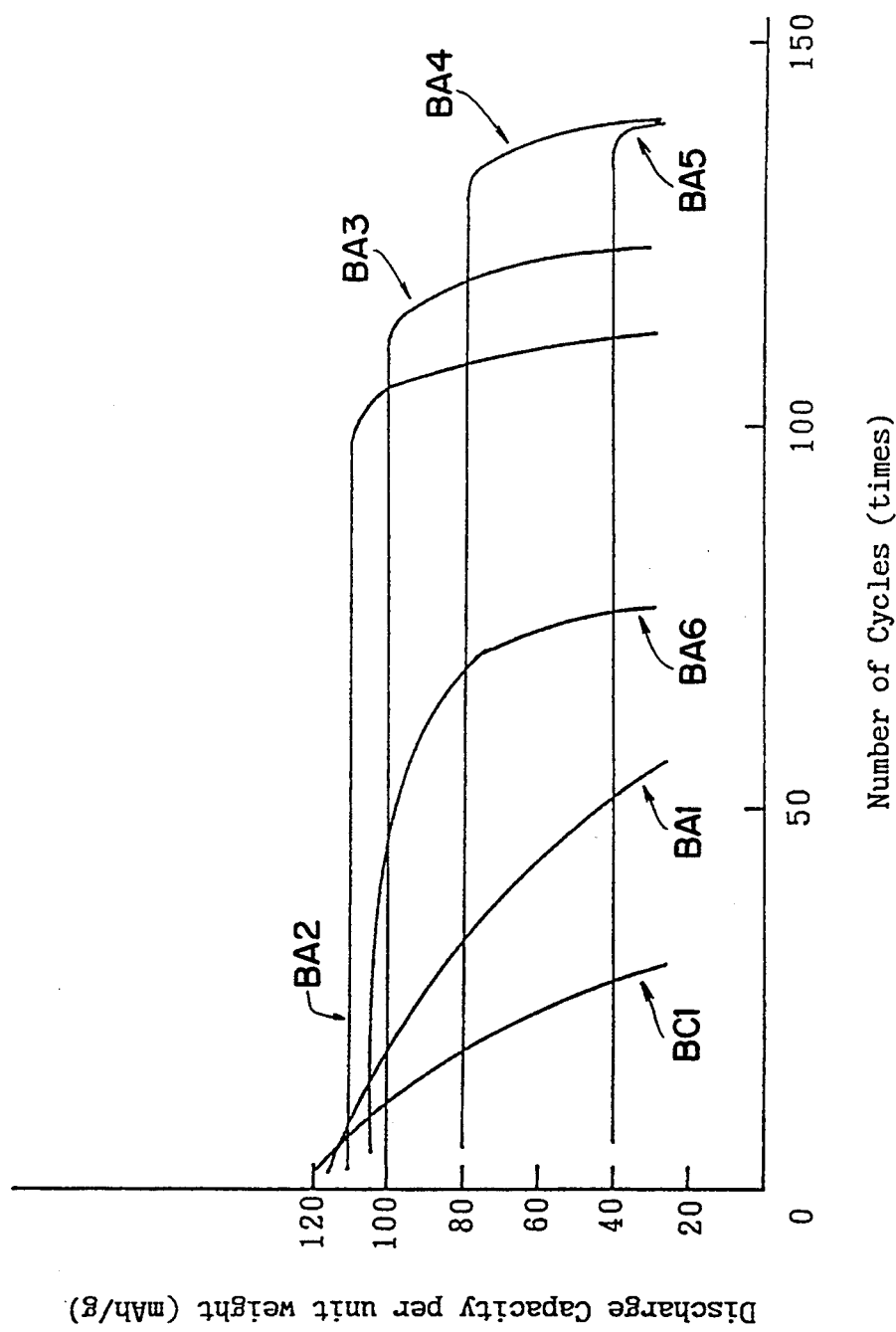
FIG. 3 is a chart showing the charge-discharge cycle characteristics of batteries according to the present invention and comparison battery.

FIG. 3 is a graph showing the charge-discharge cycle characteristics of the batteries, wherein the ordinate represents the discharge capacity per unit weight (mAh/g) of the active materials of the positive electrodes and the abscissa the number of cycles (times).

From FIG. 3, it is apparent that the batteries BA1 through BA 6 of the present invention have better charge-discharge cycle characteristics than that of comparison battery BC1.

Further to be understood is that, from comparison of the batteries BA1 through BA6 of the present invention with one another, it is desirable to use as an active material of a positive electrode, a composite powder comprising a powder of $LiMn_2O_4$ and, selectively formed on the surface of the $LiMn_2O_4$ particles, a layer of $Li_2MnO_3$, and that it is also desirable to use one having an Li/Mn ratio of 0.52 to 1.20.

In the above Examples, for the preparation of the active materials of the positive electrodes, the heat-treatments of lithium hydroxide (LiOH) powder and $LiMn_2O_4$ powder were carried out only at 375° C., but this process can be carried out in the temperature range of from 200° C. to 1000° C.

In the above Examples, also, the batteries according to the present invention are flat-type ones. However, the nonaqueous secondary battery of the present invention may have any shape, with no particular limitation, such as cylindrical and square types.

Obviously, numerous modifications and variations of the present invention are possible in light of the above teachings. It is therefore to be understood that within the scope of the appended claims, the invention may be practiced otherwise than as specifically described herein.

What is claimed is:

1. A nonaqueous secondary battery having an active material of a positive electrode comprising a composite powder comprising $Li_{1-x}Mn_2O_4$ ($0 \leq X \leq 1$) and $Li_2MnO_3$.

2. The nonaqueous secondary battery according to claim 1, wherein said composite powder comprises particles of $Li_{1-x}Mn_2O_4$ ($0 \leq X \leq 1$) having formed on the surface thereof a layer of $Li_2MnO_3$.

3. The nonaqueous secondary battery according to either claim 1 or claim 2, wherein said composite powder has an Li/Mn ratio of 0.52:1 to 1.20:1.

4. A nonaqueous secondary battery comprising, a positive electrode, a negative electrode, and a nonaqueous electrolyte wherein said positive electrode comprises as an active material a composite powder comprising $Li_{1-x}Mn_2O_4$ ($0 \leq x \leq 1$) and $Li_2MnO_3$.

5. The nonaqueous secondary battery according to claim 4, wherein said composite powder comprises particles of $Li_{1-x}Mn_2O_4$ ($0 \leq x \leq 1$) having formed on the surface thereof a layer of $Li_2MnO_3$.

6. The nonaqueous secondary battery according to either claim 4 or claim 5, wherein said composite powder has an Li/Mn ratio of 0.52:1 to 1.20:1.

7. The nonaqueous secondary battery according to claim 4, wherein said positive electrode further comprises a binder.

8. The nonaqueous secondary battery according to claim 7, wherein said binder is fluororesin.

9. The nonaqueous secondary battery according to claim 7, wherein said positive electrode further comprises a conductive agent.

10. The nonaqueous secondary battery according to claim 9, wherein said conductive agent is carbon black.

11. The nonaqueous secondary battery according to claim 4, wherein said nonaqueous electrolyte is comprised of an organic solvent and a solute selected from the group consisting of $LiPF_6$, $LiClO_4$, $LiCF_3SO_3$, and mixtures thereof.

12. The nonaqueous secondary battery according to claim 11, wherein said organic solvent is selected from the group consisting of propylene carbonate, ethylene carbonate and 1,2-butylene carbonate.

13. The nonaqueous secondary battery according to claim 12, wherein said organic solvent further comprises dimethyl carbonate, diethyl carbonate, 1,2-dimethoxyethane, 1,2-diethoxyethane or ethoxymethoxyethane.

* * * * *